US012742499B2

(12) United States Patent
Felix et al.

(10) Patent No.: US 12,742,499 B2
(45) Date of Patent: Sep. 22, 2026

(54) DEVICE FOR SEALED CONNECTION BETWEEN TWO CONTAINMENT ENCLOSURES FOR IMPROVED SEALING

(71) Applicant: ABC TRANSFER, Tours (FR)

(72) Inventors: Julien Felix, Vendome (FR); Jean-Luc Schneider, Saint Firmin des Pres (FR); Thierry Girard, Paris (FR)

(73) Assignee: ABC Transfer, Tours (FR)

( * ) Notice: Subject to any disclaimer, the term of this patent is extended or adjusted under 35 U.S.C. 154(b) by 37 days.

(21) Appl. No.: 17/774,671

(22) PCT Filed: Nov. 5, 2020

(86) PCT No.: PCT/FR2020/052008

§ 371 (c)(1),
(2) Date: May 5, 2022

(87) PCT Pub. No.: WO2021/089950

PCT Pub. Date: May 14, 2021

(65) Prior Publication Data

US 2022/0397195 A1 Dec. 15, 2022

(30) Foreign Application Priority Data

Nov. 5, 2019 (FR) ...................................... 1912409

(51) Int. Cl.
*F16J 15/06* (2006.01)
*F16J 13/18* (2006.01)

(52) U.S. Cl.
CPC ............... *F16J 13/18* (2013.01); *F16J 15/06* (2013.01)

(58) Field of Classification Search
CPC .......... F16J 15/06; F16J 15/061; F16J 15/062; F16J 13/18; G21F 5/12
See application file for complete search history.

(56) References Cited

U.S. PATENT DOCUMENTS 4,834,400 A * 5/1989 Lebeck ................ F16J 15/3412 29/898.13
6,591,662 B1 * 7/2003 Grimard ............ G01M 3/2869 73/49.8
2008/0272551 A1 * 11/2008 Sanada ............... F16J 15/3216 277/361

FOREIGN PATENT DOCUMENTS

DE 102004018587 11/2005
EP 1440448 7/2004

(Continued)

OTHER PUBLICATIONS

Office Action of Mar. 26, 2025 in Chinese counterpart application 202080075136.2.

*Primary Examiner* — Christine M Mills
*Assistant Examiner* — L. Susmitha Koneru
(74) *Attorney, Agent, or Firm* — Falcon Rappaport & Berkman LLP

(57) ABSTRACT

The invention relates to a device for a sealed connection between two doors (2, 5) which are each provided with a coaxial complementary flange (3, 7), one of the doors (5) and the flange (3) of the other door (2) being provided with at least one peripheral seal (1, 4), wherein each of the peripheral seals (1, 4) comprises an annular seal body extended in the outer peripheral portion thereof by an annular bead (11, 41), and wherein the door and the flange having the seals comprise a tubular bearing surface (34, 54) that is complementary to the outer peripheral face (11, 44) of the seal body on the one hand and a circular groove for engagement with the bead on the other hand.

13 Claims, 4 Drawing Sheets

(56) References Cited

FOREIGN PATENT DOCUMENTS

| | | | |
|---|---|---|---|
| EP | 3294504 | 3/2018 | |
| FR | 3036054 | 11/2016 | |
| WO | 2009019404 | 2/2009 | |
| WO | WO-2013110745 A1 * | 8/2013 | ............... G21F 5/12 |

* cited by examiner

DEVICE FOR SEALED CONNECTION BETWEEN TWO CONTAINMENT ENCLOSURES FOR IMPROVED SEALING

CROSS REFERENCE TO RELATED APPLICATION

This application is a U.S. National Phase of International Application No. PCT/FR2020/052008, filed Nov. 5, 2020, which claims priority to French Patent Application No. FR1912409, filed Nov. 5, 2019, both of which are incorporated by reference herein in their entirety.

TECHNICAL FIELD OF THE INVENTION

The invention relates to a device for a sealed connection between two enclosures which each define a containment volume, each enclosure comprising a door provided with a coaxial complementary flange, the door of one of the enclosures and the flange of the door of the other enclosure being provided with at least one peripheral seal.

In the present application, enclosure is understood to mean any product, assembly or apparatus which defines a volume. Thus, it can be an insulator, a receptacle, a container, or a bag.

Containment volume is understood to mean an enclosed volume which is isolated from the external environment. This may be in particular, but not exclusively, a volume for preparing, storing and/or handling products that must not be in contact with the outside or with a user.

The connection device according to the invention is intended in particular, but not exclusively, to connect two enclosures in order to transfer products from one enclosure to the other without breaking the containment. This may include, for example, the transfer of hazardous products such as certain biological, chemical or radioactive products, the transfer of components such as stoppers, vials, plungers, syringes, etc., the transfer of environmental control devices such as culture medium plates, particle counters, etc., the transfer of cleaning systems, the transfer of liquids, powders, tools, the transfer of waste to the outside of the enclosure and/or the transfer of any element necessary to production or maintenance of the production line.

PRIOR ART

The transfer of products from one volume to another without breaking the containment of these volumes is a difficult problem to solve. To respond to this problem, double-door sealed connection devices have been developed. This includes, for example, those described in patent applications FR2777822 and FR3036054 and U.S. Pat. No. 6,591,662.

The double-door connection devices described in these documents are formed by a first and a second door/flange assembly, one of the door/flange assemblies being that of the enclosure into which the products must be transferred, the other door/flange assembly being that of the enclosure from which the products will be transferred. One of the enclosures to be connected can, for example, be a container-type waste collection receptacle, the other enclosure possibly being a handling enclosure. The flanges of each assembly define a passage opening which is closed off by a relevant door, the flanges and the doors of each of the enclosures being sealed together by a seal generally made of elastomer.

In patent applications FR2777822 and FR3036054, the enclosures are connected to one another by what is referred to as a bayonet system, the male lugs of the flange and the door of the container engaging, respectively, in the female lugs of the flange and the door of the other enclosure, followed by a rotation of the container which allows the flange of the container to be locked to the flange of the handling enclosure, as well as allowing the flange of the door of the container to be locked to the door of the enclosure, the doors connected to one another being unlocked by unlocking the doors from the respective flanges thereof.

The seals conventionally used in this type of connection device are lip seals in the shape of a fir tree (or harpoon). FIG. 1*a* to 1*c* show an example of a double-door arrangement with such seals. These connection devices are on the whole satisfactory. However, the rotational movements for locking the flanges and doors together and unlocking the doors from the respective flanges thereof in order to place the volume of the enclosures in communication, and vice versa, exert recurring stress as a result of repetitive transfer operations on the seals. This creates a risk of the seals deforming, twisting and moving when the enclosures are connected to one other given the arrangement thereof, and therefore the onset of a sealing problem which leads to the containment of the enclosures breaking.

In U.S. Pat. No. 6,591,662, the enclosures are connected by magnetic means supported by the door of each of the enclosures or by pneumatic means acting between the doors. There is no rotational movement between the doors. This is therefore known as a static environment. The seals used in this type of connection device are solid seals, which provide better placement and ensure a satisfactory seal. However, seals of this kind remain unsuitable in a dynamic environment such as that of connection devices which can be actuated by rotational movement.

The invention aims to overcome these difficulties by providing a device for the sealed connection between two containment enclosures, which device provides a reinforced, stable and durable seal between said enclosures.

SUBJECT MATTER OF THE INVENTION

To this end, and according to a first aspect, the invention provides a device for a sealed connection between two doors which are each provided with a coaxial complementary flange having, advantageously, a cylindrical coupling interface, one of the doors and the flange of the other door being provided with at least one peripheral seal, said device being characterized in that each of said peripheral seals comprises an annular seal body extended in the outer peripheral portion thereof by an annular bead, the door and the flange which support the seals comprising a tubular bearing surface that is complementary to the outer peripheral face of the seal body on the one hand and a circular groove for engagement with the bead on other hand, the seal body preferably comprising at least one face, which is in contact with one of the flanges and/or one of the doors, that is not smooth.

Thus, due to the arrangement of the seals and the assembly thereof with the portion supporting them, the seals provided on the connection device have a greater resistance to the friction encountered during rotational movements of the elements with respect to one another when one enclosure is connected to another enclosure and during opening when a component is transferred from one enclosure to another, and vice versa.

Advantageously, the seals have an “L” cross section. This configuration provides the advantage of being simple to machine. This configuration thus makes it possible to reduce the risk of sealing difficulties, and therefore the risk of breaking the containment as a result of poor machining.

Advantageously, the seals are reversed symmetrically with respect to the transverse plane when the doors and the flanges are connected to one another.

Advantageously, the outer peripheral face of the seal body is smooth.

Advantageously, the seal body has a non-smooth tubular inner peripheral contact face and/or a non-smooth annular front contact face. This thus makes it possible to promote friction when the container is connected to the handling enclosure and thus to reinforce the seal.

Advantageously, the seal body has a thickness greater than that of the annular bead.

Advantageously, the seals are made fully or partly of a silicone material or other materials which minimize the effect of charged remanence or which have an anti-friction surface treatment.

Advantageously, the seals comprise a reinforcement insert.

The advantage of a connection device of this kind is that it can be implemented with a rotary mechanism for locking and unlocking doors and flanges while providing a reinforced, stable and durable seal similar to that of a static seal.

The invention also relates to a seal for a flange or a door which is intended to form a connection device as described above, comprising an annular seal body extended at the outer peripheral portion thereof by an annular bead, said seal body advantageously having a non-smooth tubular inner peripheral face and/or a non-smooth annular front face. The tubular inner peripheral face and the annular front face define faces which are intended to be in contact with one of the flanges and/or one of the doors of the connection device.

The invention also relates to a door which is provided on a containment enclosure and is provided with a seal as described above.

The invention also relates to a containment enclosure which is provided with a seal as described above.

The invention also relates to an insulator comprising a flange which defines an access opening into the interior of the enclosure, a door which sealingly closes off the access opening, and a seal as described above, which is supported by the flange or the door.

BRIEF DESCRIPTION OF THE DRAWINGS

Other features and advantages of the invention will become apparent from the following detailed description of the invention with reference to the appended drawings, in which:

FIG. 4*bis* shows an alternative embodiment of the seal of the component part of the connection device from FIG. 3;

FIG. 6*bis* shows an alternative embodiment of the seal of the component part of the connection device from FIG. 5;

FIG. 8*bis* shows an exploded perspective view of the door constituting the component part from FIG. 8;

FIG. 9*bis* is an exploded perspective view of the flange constituting the component part from FIG. 9.

For greater clarity, identical or similar elements of the various embodiments are denoted by identical reference signs in all of the drawings.

DETAILED DESCRIPTION OF THE INVENTION

Figure 1A:
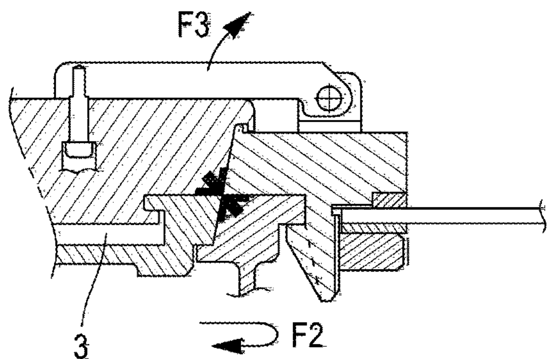
FIG. 1*a* is a cross-sectional view of a device of the prior art for the sealed connection between two enclosures.
Figure 1B:
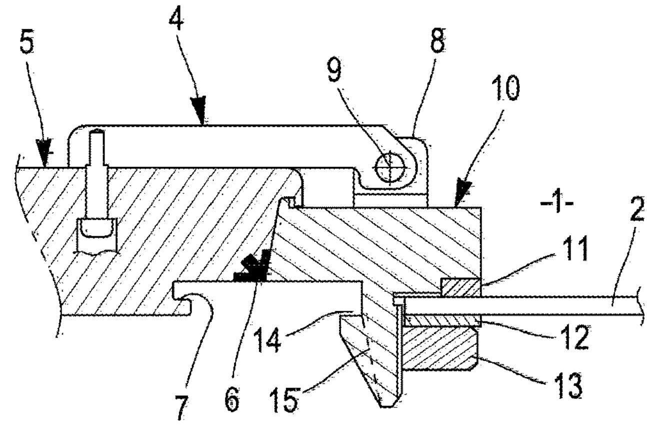
FIG. 1*b* is a cross-sectional view of one of the component parts of the connection device from FIG. 1*a;*
Figure 1C:
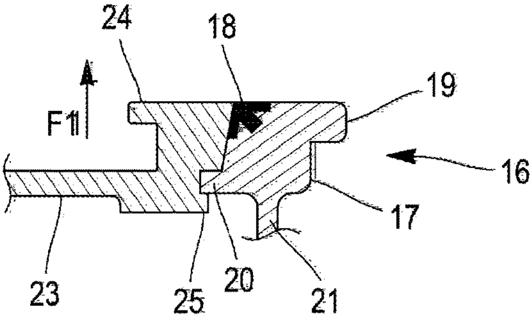
FIG. 1*c* is a cross-sectional view of the other component part of the connection device from FIG. 1*a;*

In relation to FIGS. 2 to 7, a device for the sealed connection between two enclosures isolated from the external environment is described. Each enclosure comprises a flange 3, 7 and a door 2, 5 which sealingly closes off the opening defined by the associated flange.

According to a particular embodiment, one of the enclosures is fixed while the other enclosure is a transportable enclosure. The fixed enclosure can be a handling enclosure while the transportable enclosure can be a container or a bag. The handling enclosure thus comprises a flange 7 and a door 5 which is preferably circular and sealingly closes off the opening defined by the flange 7. The door 5 is mounted so as to be hinged with respect to the flange 7 about an axis tangential to said flange. Similarly, the container comprises a flange 3 and a door 2 which sealingly closes off the opening defined by the flange 3. The door 2, which is also circular, is sized to fit in the opening defined by the flange 7 of the door 5 of the handling enclosure so as to allow said door to pass through the opening.

The connection device comprises two portions which are each provided with a coaxial complementary flange having an advantageously cylindrical or conical coupling interface. Each portion is formed by the door of one of the enclosures, the complementary flanges being the flanges which define the access openings of the respective enclosures.

The connection device further comprises two peripheral seals 1, 4. In the embodiment shown, one of the seals 4 is supported by the door 5 of the handling enclosure while the other seal 1 is supported by the flange 3 of the container. It is of course clear that a reverse arrangement of the seals can be provided without departing from the scope of the invention.

Figure 4:
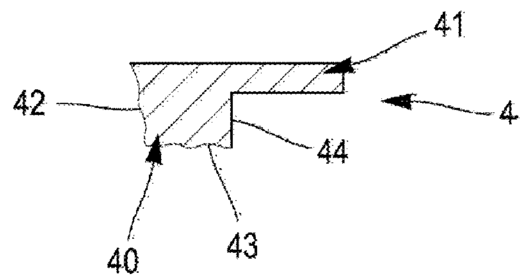
FIG. 4 shows the seal of the component part of the connection device from FIG. 3.
Figure 6:
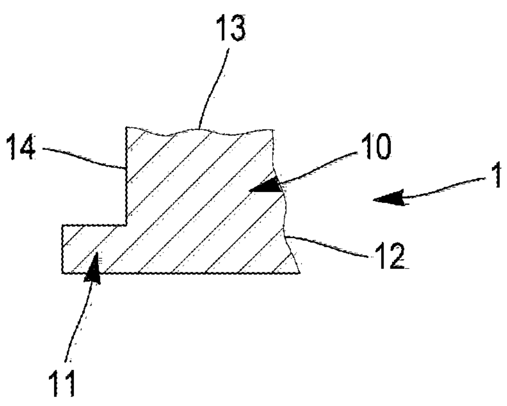
FIG. 6 shows the seal of the component part of the connection device from FIG. 5.
Figure 7:
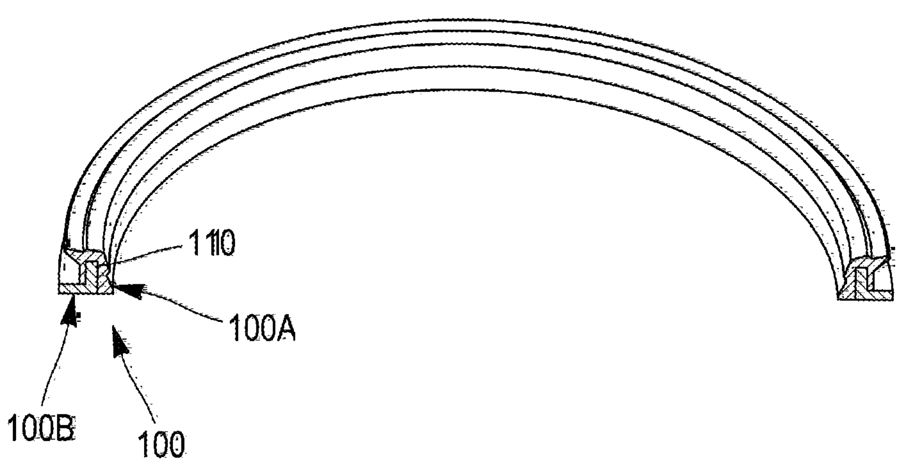
FIG. 7 shows the connection device from FIG. 2, the enclosures being open towards one other without breaking the containment.
Figure 7:
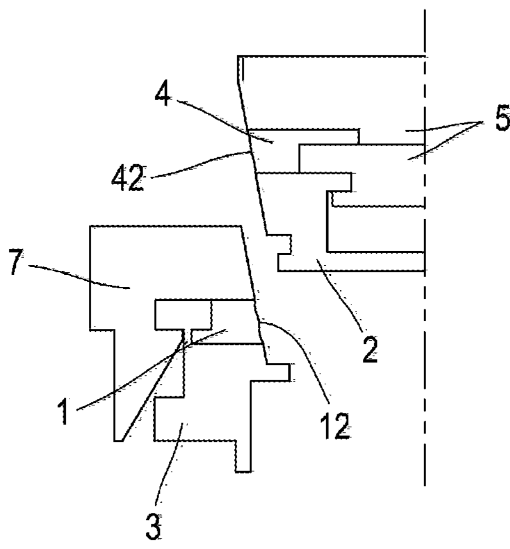

Each seal 1, 4 has an annular seal body 10, 40, which has an advantageously parallelepipedal cross section, and said body is extended in the outer periphery thereof by an annular bead 11, 41. According to a preferred embodiment, each seal 1, 4 has a substantially L-shaped cross section (FIGS. 4 and 6).

Figure 2:
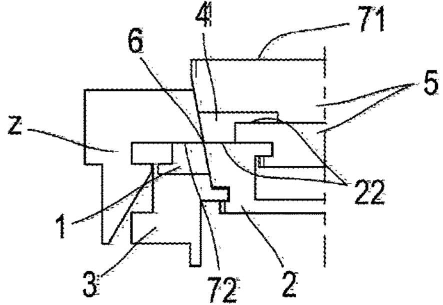
FIG. 2 is a cross-sectional view of a device for the sealed connection between two enclosures according to the invention.

Each seal 1, 4 is received in a housing of a matching shape provided for this purpose in the part (door or flange) supporting said seal. Each seal is thus arranged to completely fill the housing, leaving no voids or interstices with the doors and flanges with which it is associated. As shown in FIG. 2, when the container is connected to the handling enclosure, the seal 4 of the door 5 of the handling enclosure is in contact with a circular supporting surface 22 of the door 2 of the container, while the seal 1 of the flange 3 of the container is in contact with a circular supporting surface 72 of the flange 7 of the handling enclosure (FIG. 2).

Figure 3:
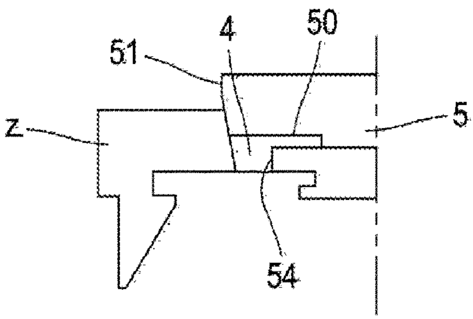
FIG. 3 is a cross-sectional view of one of the component parts of the connection device from FIG. 2.

Thus, and more particularly, the door 5 of the handling enclosure comprises a circular groove 50 in which the annular bead is engaged by force (FIG. 3). The groove opens onto the outer peripheral face 51 of the door 5, which face the associated flange 7 abuts when the door of the handling enclosure is closed. The groove 50 of the door is defined by a tubular bearing surface 54 that is complementary to the outer peripheral face 44 of the seal body 40 (FIGS. 3 and 4).

Figure 5:
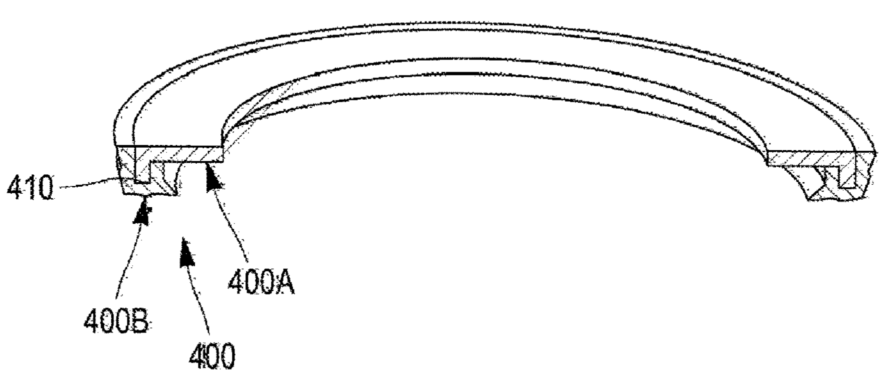
FIG. 5 is a cross-sectional view of the other component part of the connection device from FIG. 2.
Figure 5:
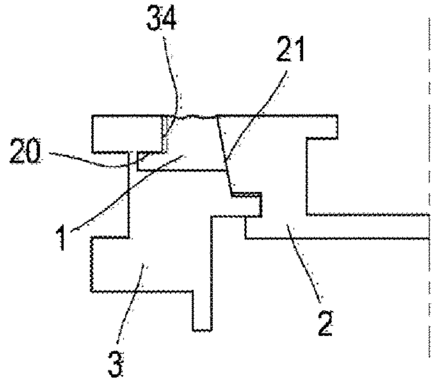

Similarly, the flange 3 of the handling enclosure comprises a circular groove 20 in which the annular bead 11 is engaged by force. The groove 20 opens onto the inner side of the flange 3. The groove 20 of the flange 3 is defined by a tubular bearing surface 34 that is complementary to the outer peripheral face 14 of the seal body 10 (FIGS. 5 and 6).

In the illustrated embodiment, the grooves 20 and 50 are arranged so as to have a flat bottom and a single edge. This thus makes it possible to facilitate the positioning of the seals 1 and 4 in the respective grooves 20, 50 thereof and to maintain the general geometry of the seals when they are inserted.

When installed in the part supporting it, the seal body of each seal 1, 4 has two faces which seal the part supporting the seal with respect to the other part of the same portion, on the one hand, and the parts with the same functionality (door/door or flange/flange seal), on the other hand, when the two enclosures are connected.

Thus, and more particularly, the inner peripheral face 42 and the annular (outer) front face 43 of the seal body 40 define, respectively, a first sealing face 42 which seals the flange 7 with respect to the door 5 and a second sealing face 43 which seals the door 5 that supports it with respect to the door 2 of the container. “Front face” is understood to mean the face oriented toward the exterior side of the enclosure taken individually (i.e., without being connected to another enclosure).

The seal 4 of the door is arranged such that the sealing face 42 in contact with the flange 7 extends in the same plane as the outer peripheral face 51 of the door 5 and thus defines a conical sealing interface when the door 5 of the handling enclosure is closed but also when the container is connected to the handling enclosure, the doors being closed.

Similarly, the inner peripheral face 12 and the front (or outer) face 13 of the seal body 10 define, respectively, a first sealing face 12 which seals the flange 3 and the door 2 and a second sealing face 13 which seals the door 2 that supports it with respect to the door 5 of the handling enclosure.

The seal 1 of the flange is arranged such that the sealing face 12 in contact with the door 2 extends in the same plane as the inner peripheral face 21 of the door 2 and thus defines a conical sealing interface when the door 2 of the container is closed but also when said container is connected to the handling enclosure, the doors being closed.

The sealing face 43 of the seal body 40 which abuts the supporting surface 22 of the door 2 of the container defines an annular sealing interface when the receptacle is connected to the handling enclosure, whether the doors are locked on the respective flanges thereof or unlocked. When the doors are unlocked from the respective flanges thereof to allow communication between the two enclosures, the two doors 2, 5 are sealed by the seal 4 via the sealing face 43 while the two flanges 3, 7 are sealed by the seal 1 via the sealing face 13.

As illustrated in FIG. 2, when the enclosures are connected to one another, the seals are located so as to be reversed symmetrically with respect to the transverse plane.

In the embodiment described, and as shown in FIGS. 4 and 6, the sealing faces 12, 13, 42, 43 are not smooth so as to promote friction when connecting the container to the handling enclosure, thereby improving connection forces. This also makes it possible to limit the friction between the surface of the seal and the contact surface of the flange or of the door, as the appropriate. The sealing faces can thus be provided with scores, serrations, teeth, pins or can have a surface condition that promotes friction.

Figure 8:
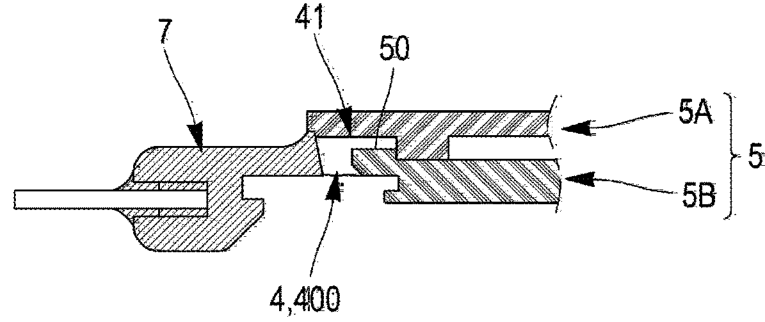
FIG. 8 shows an alternative embodiment of the component part from FIG. 3.
Figure 9:
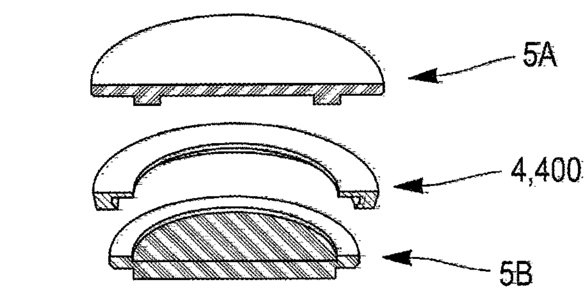
FIG. 9 shows an alternative embodiment of the component part from FIG. 5.
Figure 9:
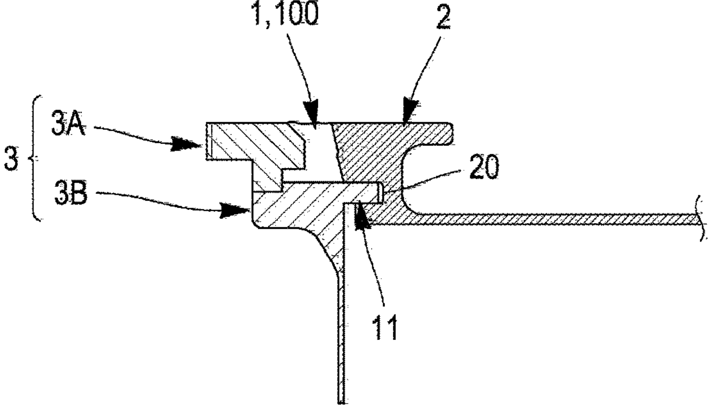

In the embodiments which have just been described and are shown in FIGS. 2 to 7, the grooves 20, 50 are arranged directly in the parts supporting the seals, namely the door of the handling enclosure and the flange 3 of the container, the seals 1, 4, 100, 400 then being force-fitted in these grooves. In order to facilitate installation and removal of the seals, an alternative embodiment is provided in which the parts supporting the seals are formed in two separate portions. FIGS. 8, 8*bis*, 9 and 9*bis* illustrate an arrangement of this kind.

Thus, and as shown in these drawings, the door 5 consists of an upper portion 5A and a lower portion 5B between which the seal 4, 400 is inserted. The portions 5A, 5B are arranged to define, when assembled, the groove 50 which receives the bead 41 of the seal 4, 400.

Similarly, the flange 3 consists of an upper portion 3A and a lower portion 3B between which the seal 1, 100 is inserted. The portions 3A, 3B are arranged to define, when assembled, the groove 20 which receives the bead 11 of the seal 1, 100.

In addition to facilitating the installation of the seals 1, 100, 4, 400, this configuration of the parts which support the seals into two separate portions has the advantage of allowing reinforced support of the seals due to the clamping of the bead 11, 41 between the upper and lower portions of the door 5 and of the flange 3, which provides better strength of the seals when the two assembled doors are opened.

The annular seal body of the seals has a thickness greater than that of the annular bead. In the illustrated embodiment, the ratio is three. This is of course one embodiment, and a different thickness ratio can be provided without departing from the scope of the invention. By thus making the portion of the peripheral seals subjected to stress during use of the connection device (connection of the enclosures to one another and opening of the doors) more “solid”, the risks of the seal deforming, twisting and moving are reduced.

Advantageously, the seals 1, 4 are made of a silicone material or other materials which minimize the effect of remanence. Provision may also be made for the seals to be made of a bacteriostatic material in order to prevent the proliferation of bacteria. An example of bacteriostatic material is described in application EP316052.

In the embodiment described above, the seals 1, 4 are made of a single material. Provision may however be made for the seals to include an insert in order to stiffen said seals and thus improve the strength thereof. An example of this type of seal is shown in FIGS. 4*bis* and 6*bis*. In this example, each seal 100, 400 is formed of two portions, one of the portions forming the flexible portion 100A, 400A of the seal (advantageously made of silicone material or any other material which minimizes the effect of remanence), the other portion being an insert 100B, 400B, preferably made of metal. In the illustrated embodiment, each insert 100B, 400B has an L-shaped cross section of which the longest arm is arranged to define the annular bead of the seal concerned, the other arm being housed in a matching groove 110, 410 provided in the flexible portion 100A, 400A.

The shape of the seals 1, 4, 100, 400 according to the invention and the arrangement thereof with the doors and flanges of the connection device makes it possible to create a “solid” sealing region, i.e., without a cavity or void (referred to as hidden regions) unlike the seals of the prior art which have regions of this kind that promote the retention of liquids and bacteria.

The shape of the seals 1, the invention and the arrangement thereof with the doors and flanges of the connection device also makes it possible to minimize the annular region of contamination (region in contact with the external environment).

The shape of the seals according to the invention and the arrangement thereof with the doors and flanges of the connection device also allows easy installation and removal of the seals in the doors and flanges of the enclosures in question and provides better cleanability.

The invention has been described in relation to the connection of a container to a handling enclosure. It is of course clear that the invention is not limited to a use of this kind, since other types of enclosures are able to be connected to one another.

The invention is described above by way of example. It is understood that a person skilled in the art is in a position to produce various alternative embodiments of the invention without, however, departing from the scope of the invention.

The invention claimed is:

1. A device for a sealed connection between a first enclosure and a second enclosure, said first enclosure comprising a first opening and said second enclosures comprising a second opening, said device comprising:

a first door provided with a first coaxial complementary flange intended for delimiting said first opening of said enclosure, a second door provided with a second coaxial complementary flange intended for delimiting said second opening of said second enclosure, a first peripheral seal assembled with the first door and arranged between the first door and the first flange when the first door is closed off on the first flange, a second peripheral seal assembled with the second flange and arranged between the second door and the second flange when the second door is closed off on the second flange, wherein said first peripheral seal comprises a first annular seal body extended in the inner peripheral portion thereof by a first annular bead, said first annular seal body and said first annular bead defining an inner peripheral face forming a shoulder, wherein said second peripheral seal comprises a second annular seal body extended in the outer peripheral portion thereof by a second annular bead, said second annular seal body and said second annular bead defining an outer peripheral face forming a shoulder, wherein the first door comprises a tubular bearing surface that is complementary to the inner peripheral face of the first annular seal body of said first peripheral seal on the one hand and a circular groove in which the first annular bead of said first peripheral seal is engaged on the other hand, wherein the second flange comprises a tubular bearing surface that is complementary to the outer peripheral face of the second annular seal body of said second peripheral seal on the one hand and a circular groove in which the second annular bead of said second peripheral seal is engaged on the other hand, wherein the first annular seal body of the first peripheral seal comprises at least one non-smooth face which is in contact with said first flange and/or said second door, wherein the second annular seal body of the second peripheral seal comprises at least one non-smooth face which is in contact with said second flange and/or said first door.

2. The device for a sealed connection according to claim 1, characterized in that the seals have an “L” cross section.

3. The device for a sealed connection according to claim 1, characterized in that the seals are reversed symmetrically with respect to the transverse plane when the doors and the flanges are connected to one another.

4. The device for a sealed connection according to claim 1, characterized in that the outer peripheral face of the seal body is smooth.

5. The device for a sealed connection according to claim 1, characterized in that the seal body has a non-smooth tubular inner peripheral contact face.

6. The device for a sealed connection according to claim 1, characterized in that the seal body has a non-smooth annular front contact face.

7. The device for a sealed connection according to claim 1, characterized in that the seal body has a thickness greater than that of the bead.

8. The device for a sealed connection according to claim 1, characterized in that the seals are made fully or partly of a silicone material or other materials which minimize the effect of charged remanence or which have an anti-friction surface treatment.

9. The device for a sealed connection according to claim 1, characterized in that the seals comprise a reinforcement insert.

10. A seal for a flange or a door which is intended to form a connection device according to claim 1, comprising an annular seal body which is extended at the outer peripheral portion thereof by an annular bead, said seal body having a non-smooth tubular inner peripheral face and/or a non-smooth annular front face.

11. A door which is provided on a containment enclosure and is provided with a seal according to claim 10.

12. A flange which is provided on a containment enclosure and is provided with a seal according to claim 10.

13. An insulator comprising a flange which defines an access opening into the interior of the enclosure, a door which sealingly closes off the access opening, and a seal according to claim 10, which is supported by the flange or the door.

* * * * *